United States Patent [19]

Hayes et al.

[11] 3,821,516

[45] June 28, 1974

[54] METHOD AND APPARATUS FOR SENSING AND REGULATING THE TEMPERATURE OF A FLUID

[75] Inventors: David F. Hayes, Henrietta; Stanley M. Roth, East Meadow, both of N.Y.

[73] Assignee: Laurel Color, Inc., West Hempstead, N.Y.

[22] Filed: Jan. 15, 1973

[21] Appl. No.: 323,736

[52] U.S. Cl. ............... 219/497, 219/327, 219/494, 219/499, 219/501
[51] Int. Cl. ............................................. H05b 1/02
[58] Field of Search ........... 219/494, 497, 499, 501, 219/327

[56] References Cited
UNITED STATES PATENTS

| | | | |
|---|---|---|---|
| 3,315,892 | 4/1967 | Haake | 219/497 X |
| 3,553,429 | 1/1971 | Nelson | 219/497 |
| 3,597,588 | 8/1971 | Kirschner | 219/327 X |
| 3,702,921 | 9/1971 | Thelen | 219/497 X |

*Primary Examiner*—J. D. Miller
*Assistant Examiner*—Fred E. Bell
*Attorney, Agent, or Firm*—Bierman & Bierman

[57] ABSTRACT

Method and apparatus for sensing and regulating the temperature of a fluid is provided having means for generating a first signal whenever the actual temperature of the fluid whose temperature is to be regulated is lower than a preselected temperature level. The first signal has an amplitude proportional to the magnitude of the difference between the actual fluid temperature and the preselected temperature level. Means are provided for generating an output signal whenever the amplitude of a reference signal exceeds the amplitude of the first signal. Means are also provided for heating the fluid, the duration of said heating being proportional to the duration of said output signal.

21 Claims, 1 Drawing Figure

PATENTED JUN 28 1974 3,821,516
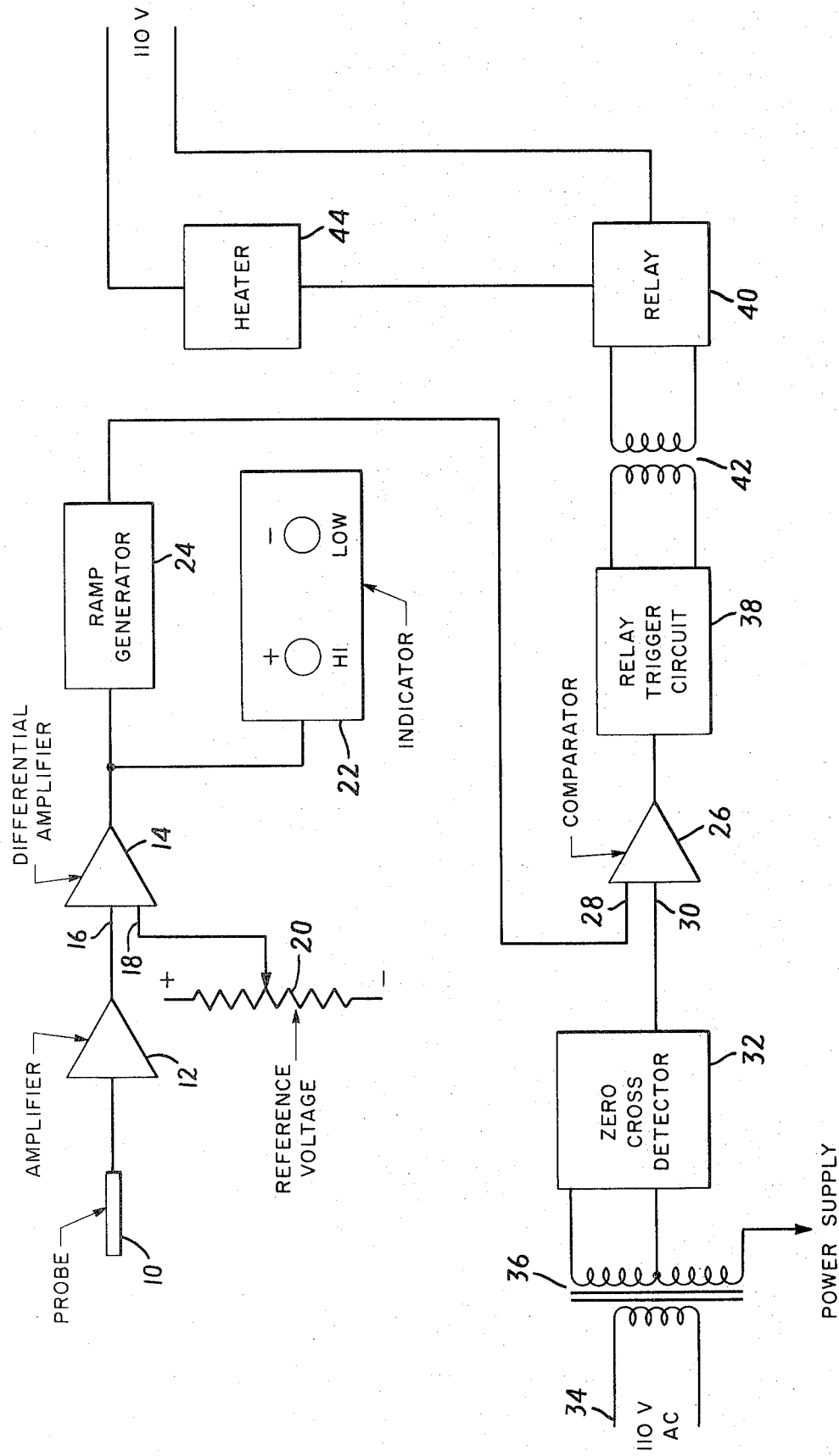

METHOD AND APPARATUS FOR SENSING AND REGULATING THE TEMPERATURE OF A FLUID

The present invention relates to temperature regulating devices and more particularly to method and apparatus for sensing and regulating the temperature of a fluid.

There are many instances in a variety of industries in which process or other fluids must be used or kept at a predetermined temperature. In the photoprocessing industry, process fluids are normally stored in containers or reservoirs and are fed into the processing vats as needed. In the photoprocessing industry, as in others, delicate control of fluid temperature is a prerequisite to good results. For example, developing fluids for color processing should be kept to within plus or minus one-half degree Fahrenheit of a selected temperature in order to achieve best results.

One of the objects of the present invention is to provide a fully automatic system for sensing and regulating the temperature of a fluid. Another object of the present invention is to provide such a system at comparatively low cost as well as one which has low operating and maintenance costs.

It is a further object of the present invention to provide a system having an adjustable output for controlling the rate at which temperature correction occurs.

It is another object of the present invention to provide a system which minimizes radio frequency interference (RFI) by minimizing current surge in the circuit when the heating unit is turned on. This is accomplished through the use of a zero cross detector which will emit a pulse each time a voltage of zero magnitude is detected in an alternating current source. Because a pulse is generated only upon the detection of a voltage of zero magnitude in the source, large current changes are not introduced into the circuit.

In accordance with the present invention, method and apparatus for sensing and regulating the temperature of a fluid are provided wherein an electrical signal is generated whenever the temperature of the fluid falls below a preselected temperature level. The magnitude of this signal is dependent upon the difference between actual measured fluid temperature as represented by a generated voltage and another voltage representing the desired fluid temperature.

An output signal is generated whenever the amplitude of an internally generated reference signal exceeds the amplitude of the electrical signal. The temperature of the fluid is regulated by heating the fluid for a time proportional to the duration of the output signal.

The preferred embodiment disclosed herein shows the apparatus set up for use to regulate the temperature of a fluid by heating. However, with minor modifications which are well within the ability of one having ordinary skill in the art, the system can be used to perform both heating and cooling functions co-jointly. The necessity for such modifications will, of course, depend upon the results desired.

The drawing depicts a preferred embodiment of the present invention and forms a part hereof. This drawing shows a block diagram of the circuits which comprise the invention. A probe 10 is positioned in the fluid whose temperature is to be regulated and used to sense the temperature of the fluid and to generate a voltage proportional to the fluid temperature. Any conventional temperature sensing device can be used for this purpose, such as a semiconductor junction or a thermistor. The voltage generated by probe 10 is amplified in amplifier 12 and then fed to differential amplifier 14.

Differential amplifier 14 has two inputs. The first input 16 is connected to the output of amplifier 12. The second input 18 is connected to reference voltage source 20. Source 20 is any voltage source whose magnitude can be adjusted. The voltage generated by this source corresponds to the desired temperature of the fluid and is determined by use of the calibration chart for the particular probe used. The voltage of source 20 will be set according to the expected output voltage of the probe for the temperature desired in the fluid. Differential amplifier 14 generates a signal based on the differences between the input voltages. This signal will have a magnitude corresponding to the value of the difference of the input voltages and a polarity dependent upon the direction of difference -- i.e., if the amplified voltage is greater than the reference voltage, the signal will have one polarity and if the amplifier voltage is less than the reference voltage, the polarity will be opposite.

An indicator 22 may be used in the circuit at this point, if desired. This indicator 22 is connected to receive the signal from differential amplifier 14 and to indicate whether the actual temperature of the fluid is higher or lower than the desired temperature as represented by the reference voltage. Two lamps may be employed for this purpose, one energized when the fluid temperature is too high, the other when it is too low.

The signal generated by differential amplifier 14 is fed to ramp generator 24. Ramp generator 24 generates a saw-tooth signal only if a signal of correct polarity is received from differential amplifier 14 indicating that the actual fluid temperature is lower than the desired temperature level. The frequency of this signal is constant, but the amplitude at any particular point in the saw-tooth, and therefore the slope of the signal, is dependent upon the magnitude of the signal received from differential amplifier 14.

In its preferred form, the saw-tooth signal has a negative (and therefore downwardly extending) slope. The amplitude of the signal at the beginning of each cycle was a predetermined positive value, for example 1, and the amplitude of the signal at the end of each cycle will be zero. The slope will determine how fast the signal reaches the zero value. The greater the signal from differential amplifier 14, the more negative the slope and, therefore, the faster the amplitude reaches the zero value during each cycle.

Although this is the preferred method of generating the saw-tooth signal, the apparatus can function if the saw-tooth signal has a positive (upwardly extending) slope. In this case, however, the heating function will be initiated when the amplitude of the saw-tooth signal exceeds the amplitude of the reference pulse. A modification such as this would be well within the knowledge of one skilled in the art.

The saw-tooth signal from ramp generator 24 is fed into comparator 26. Comparator 26 has two inputs 28 and 30. The saw-tooth signal from ramp generator 24 is received through input 28. Input 30 is connected to zero cross detector 32. Zero cross detector 32 is, in turn, connected to an alternating current source 34 by means of a conventional stepdown transformer 36 which transformer is used to reduce the AC input level to the system. Zero cross detector 32 generates a pulse of predetermined duration and magnitude each time the magnitude of the A-C input signal becomes zero. This series of pulses acts as a reference signal. Since a pulse is generated by detector 32 only when the magnitude of the A-C input signal is zero, current surge within the circuit is minimized as no current passes through detector 32 creating extraneous current flow. In addition, since, as explained below, the heating unit will be energized only during the presence of a pulse upon the detector 32, power utilization is minimized because no current is dissipated by the circuit during the times when the heating unit is inoperative.

Source 34 must, therefore, be alternating current. If source 34 alternates at X cycles per second, then a current of zero magnitude will occur 2X times per second. Therefore, zero cross detector 32 will generate 2X pulses per second to the input 30 of comparator 26.

Comparator 26 compares the amplitude of the saw-tooth output of ramp generator 24 with the pulse generated by zero cross detector 32 and generates an output signal. This output signal is generated only if the amplitude of the saw-tooth signal is less than the amplitude of the pulse from detector 32 and only for the duration of the pulse. Therefore, the steeper the negative slope of the saw-tooth signal, the greater the number of output signals during any one period of the saw-tooth wave.

For example, if the frequency of source 34 is 60 cycles per second, then detector 32 will detect a zero current magnitude 120 times per second and generate 120 pulses each second. If the saw-tooth wave has a frequency of 12 cycles per second, comparator 26 will receive 10 pulses during each saw-tooth. If the slope of the saw-tooth wave is such that the amplitude of the saw-tooth signal becomes less than the amplitude of the received pulses during the third pulse in each cycle, comparator 26 will generate an output signal during the third pulse. Since the saw-tooth has a negative slope, the amplitude will be less than the amplitude of the pulses for the rest of the saw-tooth cycle and, therefore, output signals will be generated during each of the remainder of the 10 pulses. The number of the output signals from comparator 26 depends upon the slope of the saw-tooth wave.

In addition, the point at which the amplitude of the saw-tooth wave becomes less than the amplitude of the pulses generated by detector 32 depends also upon the amplitude of these pulses. This amplitude may be made adjustable. Adjusting this amplitude will serve to adjust the sensitivity of the device and speed up or slow down the application of heat to the fluid. The amplitude of the pulse generated by detector 32 will normally be preset according to the type of heating units used, the properties of the fluid whose temperature is being regulated, and the results desired.

The output signal generated by comparator 26 is fed to a relay trigger curcuit 38. Upon receipt of an output signal from comparator 26, relay trigger circuit 38 will trigger the relay 40 connected to it by means of a conventional pulse transformer 42.

Relay 40 may be any conventional type of relay, preferably solid state. A thyristor, such as the one sold under the tradename TRIAC has proven acceptable for this purpose. Relay 40 serves to energize heater 44 by connecting it to an electric source shown here as 100 v. AC each time an output signal is received from comparator 26. Thus, the number of output signals from comparator 26 will determine the duration of the activation of heating unit 44.

Relay 40 turns off whenever the voltage across it reaches zero or changes polarity. Therefore, the heater circuit is connected via the relay only during the time that a fixed polarity voltage is present across the relay. Since the required voltage will only be present when heat is needed, the relay will automatically turn off the heater in response to an opposite polarity or zero voltage impressed across the relay.

Heater 44 is a conventional device and has its heating elements placed to most effectively regulate the temperature of the fluid. They may be located in or around a portion of the container or reservoir in which the fluid is stored or be in or around the feed lines through which the fluid passes. The placement of these elements will depend upon the requirements of each particular application of the system.

If desired, the present invention can be utilized to both heat and cool the fluid. Modifications of the system disclosed herein to perform both functions alternatively are well within the skill of one having ordinary skill in the art.

It will be understood that we intend to cover all changes and modifications of the preferred form of our invention herein chosen for the purposes of illustration which do not constitute departures from the spirit and scope of the invention.

What is claimed is:

1. Apparatus for sensing and regulating the temperature of a fluid comprising means for generating a first signal whenever the temperature of said fluid is lower than a preselected temperature level, said first signal having an amplitude proportional to the magnitude of the difference between the actual temperature and the preselected temperature level, means for generating a reference signal for comparison with said first signal, having a series of pulses with a predetermined frequency and amplitude, a comparator for comparing said reference signal to said first signal and for generating an output signal whenever the amplitude of said reference signal exceeds the amplitude of said first signal, and means for heating said fluid, said means being activated to heat said fluid upon receipt of said output signal, the duration of said activation being proportional to the duration of said output signal.

2. The apparatus specified in claim 1 wherein said first signal-generating means comprises means for generating a voltage in accordance with the actual temperature of the fluid.

3. The apparatus specified in claim 2 wherein said means for generating a signal in accordance with the temperature of said fluid comprises a probe for sensing the temperature of the fluid and generating a voltage having a magnitude proportional to the temperature of the fluid.

4. The apparatus specified in claim 2 wherein said means for generating a signal in accordance with the temperature of the fluid further comprises an amplifier for amplifying the voltage generated by said probe.

5. The apparatus specified in claim 2 wherein said first signal generating means further comprises a signal source for generating a voltage corresponding to the desired temperature of the fluid.

6. The apparatus specified in claim 5 wherein said first signal generating means further comprises means for comparing the voltage proportional to the actual temperature of the fluid with the voltage corresponding to the desired temperature of the fluid and generating a signal having an amplitude proportional with the magnitude of said difference.

7. The apparatus specified in claim 6 wherein said comparing means is a differential amplifier.

8. The apparatus specified in claim 6 wherein said first signal-generating means further comprises a saw-tooth wave generator, said saw-tooth generator generating a saw-tooth wave having an amplitude corresponding to the amplitude of the signal received from said comparing means.

9. The apparatus specified in claim 1 wherein said reference signal-generating means further comprises a source of alternating current.

10. The apparatus specified in claim 10 wherein said reference signal-generating means comprises a zero cross detector, said detector generating a pulse each time a zero magnitude is detected in said alternating current source.

11. The apparatus specified in claim 1 wherein said output signal-generating means comprises means for comparing said first signal and said reference signal.

12. The apparatus according to claim 1 wherein said heating means comprises a heating unit.

13. The apparatus specified in claim 12 wherein said heating means further comprises a relay, said relay adapted to activate said heating unit.

14. The apparatus according to claim 12 wherein said heating unit comprises a relay trigger circuit adapted to energize said relay in accordance with said output signal.

15. Apparatus for sensing and regulating the temperature of a fluid comprising a probe for sensing the actual temperature of the fluid and generating a first voltage signal in accordance therewith, an amplifier for amplifying the first voltage signal generated from said probe, a voltage source generating a second voltage signal corresponding to the desired temperature of the fluid, a differential amplifier for generating a signal whose polarity is dependent upon the direction of difference between said first voltage signal and said second voltage signal and whose amplitude is proportional to the magnitude of said difference, a ramp generator for generating a saw-tooth signal whenever said first voltage signal is less than said second voltage signal and whose amplitude is proportional to the magnitude of the difference between said first and second voltage signals, an alternating current source, a zero cross detector connected to said alternating current source for generating a reference signal comprising a series of pulses one of which is generated each time said detector detects a current of zero magnitude in said current source, a comparator for comparing said saw-tooth wave and said reference signal, said comparator generating an output signal whenever the amplitude of said reference signal exceeds the amplitude of the saw-tooth wave, a heating unit, a relay to activate said heating unit, and a relay trigger circuit, said circuit activated to trigger said relay upon the receipt of an output signal from said comparator.

16. A method for sensing and regulating the temperature of a fluid comprising the steps of generating a first signal whenever the temperature of said fluid differs from a preselected temperature level, said signal being generated with an amplitude proportional to the magnitude of said difference, generating a reference signal having a series of pulses with a predetermined frequency and amplitude, comparing said reference signal to said first signal, generating an output signal, said output signal being generated whenever the amplitude of said reference signal exceeds the amplitude of said first signal, and heating the fluid in accordance with said output signal for a time proportional to the duration of said output signal.

17. The method specified in claim 16 wherein the step of generating a first signal comprises the steps of sensing the temperature of said fluid, generating a first voltage signal in accordance with said temperature, and amplifying said voltage signal.

18. The method specified in claim 17 wherein the step of generating said first signal further comprises the step of generating a saw-tooth wave whose amplitude is proportional to the amplitude of said signal.

19. The method specified in claim 18 wherein the step of generating an output signal comprises the steps of providing an alternating current source, detecting each time the magnitude of the current is zero in said source, and generating a reference signal having a pulse each time the zero current is detected in said source.

20. The method specified in claim 19 wherein the step of generating an output signal further comprises the step of comparing said saw-tooth wave and said reference signal.

21. The method specified in claim 20 wherein the step of heating the fluid comprises the steps of triggering a relay in accordance with duration of said output signal and activating a heating unit to heat the fluid.

* * * * *